3,005,682
METHOD OF DISSOLVING PLUTONIUM DIOXIDE
IN NITRIC ACID USING CERIUM IONS
Archie S. Wilson, Richland, Wash., assignor to the United
States of America as represented by the United States
Atomic Energy Commission
No Drawing. Filed Mar. 10, 1959, Ser. No. 798,554
6 Claims. (Cl. 23—14.5)

This invention relates to a catalyst for the dissolution in nitric acid of plutonium dioxide, and to the method of using the same.

Plutonium dioxide, the commonest and most stable oxide of the fissionable element plutonium, is of increasing importance in the neutronic nuclear reactor art. It is a dense, hard, refractory ceramic substance with great chemical inertness which is advantageous in many respects since it resists corrosion as well as physical change in the environment of nuclear reactors. While there is no theoretical reason why it should not be used as the sole fuel in such reactors, for economic reasons it is usually mixed with uranium dioxide to make up the fuel elements which, in the solid fuel type of reactors, are rods or slugs of the mixed oxides clad with a metal of low thermal neutron capture cross section such as aluminum or zirconium; in the liquid or so-called homogeneous type of reactors the mixed oxides are present in slurry form as is well known in the art.

Like all fissionable fuels plutonium dioxide, in order to be useful, must be free within certain limits of impurities known as poisons, which are chemical elements that interfere with the neutronic reaction of the reactor; these may be introduced into the reactor from the outside in some manner, but are more commonly the result of the fission process within the reactor, and their accumulation after an extended period of reactor operation is one of the main reasons for the periodic shutdown during which the spent fuel is replaced by new fuel of greater purity which is often fuel from a previous run of the reactor which has undergone a refining process. Another reason why the refining of plutonium dioxide is required is safety, since some of the fission products are gases such as xenon which tend to rupture the metal protective cladding of solid fuel elements and thereby release dangerous radioactive substances into the reactor. Other good reasons exist for the desirability of refining plutonium dioxide but as these are well known in the nuclear art a complete enumeration will not be attempted; the above-mentioned two considerations are sufficient to show the utility of the invention which is addressed to an improvement in the presently known refining processes.

A number of refining processes for plutonium dioxide are presently known, the chief group of which are the aqueous, or so-called "wet chemical" processes, in which plutonium dioxide is brought into aqueous solution and then refined by ion exchange, by liquid-liquid solvent extraction, or by some other "wet chemical" procedure. The most common, if not the only feasible method by which the plutonium dioxide is initially brought into such aqueous solution is by dissolving it in nitric acid, and it is to an improvement in this method that the present invention is particularly addressed.

Unlike uranium dioxide which dissolves readily in concentrated nitric acid, plutonium dioxide dissolves but slowly and incompletely; the only previously known method for overcoming this inertness is to add as a catalyst fluoride ion in about 0.1 M concentration. The disadvantage of this procedure is that fluoride ion is highly corrosive and problems result from its use, either in removing it from the solution which is difficult, or else the entire reactor and coolant system must be given an enhanced degree of corrosion resistance, for which changes in structural materials are usually necessary, often quite extensive in character.

It has been suggested that the dissolution of plutonium dioxide in nitric acid could be improved by adding conventional oxidizing agents since the dissolution in nitric acid involves an oxidation of the plutonium from valence state IV to state VI as plutonyl nitrate ($PuO_2(NO_3)_2$), some of the nitric acid being reduced at the same time to a mixture of the oxides of nitrogen, the exact composition of which has not been as yet fully established. This suggested expedient is objectionable since a burdensome removal problem would be thereby created far exceeding in magnitude the original problem of purification since the "poisons" and other fission products are present in only very small concentrations compared to the stoichiometric amounts of oxidizing agents which would be necessary to bring about oxidation through their action.

It is the object, therefore, of the present invention to establish a method whereby plutonium dioxide can be brought into aqueous solution more quickly than by known methods without the use of the corrosive fluoride ion as a catalyst, or without the use of stoichiometric amounts of oxidizing agents.

It is more particularly an object of the invention to establish a method whereby plutonium dioxide may be quickly dissolved in nitric acid without the use of fluoride ion as a catalyst.

It is a still more particular object of the invention to establish a method whereby plutonium dioxide may be converted to plutonyl nitrate by reacting it with concentrated nitric acid without the use of fluoride ion as a catalyst, or without the use of stoichiometric amounts of oxidizing agents.

All the foregoing objects have been met by my discovery that plutonium dioxide may be dissolved in concentrated nitric acid and converted to plutonyl nitrate by the use of cerium ions as a catalyst. The temperature at which this is carried out is not critical but, of course, the known principles of thermodynamics as applied to reaction rates hold good, and I have found the most practical temperature for the purpose to be at around 115° C., which is that of boiling concentrated nitric acid. Nor does it apparently make any difference what valence state the cerium is in when it is added as a catalyst to the reaction mixture of plutonium dioxide and concentrated nitric acid; both cerous and ceric nitrate give the desired catalytic effect, as well as the double salt ammonium ceric nitrate, $(NH_4)_2Ce(NO_3)_6$. Although ceric salts are well known conventional oxidizing agents, it is certain that the ceric nitrate does not act in the usual way as a direct oxidizing agent as it does not have to be present in a stoichiometric amount but only in very small fractions thereof, in the range of about 0.001 M Ce to about 0.02 M Ce, which is evidence that its action is of a catalytic kind, and not a direct chemical attack. For this reason I refer to the amounts of cerium ions involved in this application as "catalytic amounts," as distinguished from stoichiometric amounts which may be far greater by two or more orders of magnitude.

It has been suggested that if cerium is added in the cerous state it is oxidized by the nitric acid to the ceric state, whereupon the ceric ion acts to oxidize some of the plutonium, being itself reduced to the cerous state in the process, which is repeated over and over in a kind of cyclic scheme of successive oxidations and reductions. While this explanation is plausible, I do not wish to be bound by it or any other theoretical explanation of my invention; the facts are that if cerium is added in any form or valence state to the reaction mixture described, in the above stated concentrations, a greatly enhanced rate of dissolution of plutonium dioxide ensues, and the dissolution may be carried to completion with far smaller quantities of nitric acid as the solvent than would be the case if no catalyst were employed.

EXAMPLES 1 TO 4

In Examples 1 to 3, 58 mg. of $PuO_2$ and in Example 4 45 mg. of $PuO_2$ were dissolved in 10 ml. of boiling concentrated nitric acid at about 115° C. with results shown in the following tabular form:

From the foregoing it is apparent that the use of cerium in non-stoichiometric, or catalytic, amounts brings about a marked improvement in the dissolution of plutonium dioxide in nitric acid.

What is claimed is:

1. A method for bringing plutonium dioxide into aqueous solution comprising the addition of sufficient cerium ions in catalytic amounts to the dissolving mixture of plutonium dioxide and nitric acid, to cause the mixture to be from 0.001 to 0.02 molar in cerium ions.
2. The method of claim 1 where the cerium is added to the mixture as ceric nitrate.
3. The method of claim 1 where the cerium is added to the mixture as cerous nitrate.
4. The method of claim 1 where the cerium is added to the mixture as ammonium ceric nitrate.
5. A method for dissolving plutonium dioxide in nitric acid comprising the addition of sufficient cerium ions to the dissolving mixture to cause the mixture to be from 0.001 to 0.02 molar in cerium ions.
6. A method for converting plutonium dioxide into plutonyl nitrate comprising the addition of sufficient cerium ions to the reaction mixture of plutonium dioxide and nitric acid to cause the mixture to be from 0.001 to 0.02 molar in cerium ions.

*Dissolution of plutonium dioxide in concentrated nitric acid speeded by cerium*

[58 mg. $PuO_2$ in 10 ml. conc. $HNO_3$]

| Exp. 1—0.005 M Ce | | Exp. 2—0.015 M Ce | | Exp. 3—no Ce | | Exp. 4[1]—no Ce | |
|---|---|---|---|---|---|---|---|
| Time, Hrs. | Percent Dissolved | Time, Hrs. | Percent Dissolved | Time, Hrs. | Percent Dissolved | Time, Hrs. | Percent Dissolved |
| 1.0 | 16.0 | 1.1 | 12.4 | 1.2 | 11.0 | 2.5 | 4.4 |
| 2.2 | 34.6 | 2.7 | 28.4 | 3.0 | 16.6 | 4.2 | 6.8 |
| 8.0 | 70.5 | 5.8 | 56.1 | 6.2 | 21.0 | 6.4 | 10.0 |
| 9.0 | 73.5 | 7.0 | 70.2 | 9.7 | 26.8 | 9.8 | 16.4 |
|  |  | 7.2 | 72.6 |  |  | 12.0 | 21.4 |
|  |  | 8.4 | 84.0 |  |  | 14.0 | 25.6 |
|  |  | 11.1 | 90.6 |  |  | 16.1 | 30.4 |
|  |  | 13.0 | 100.0 |  |  |  |  |

[1] Only 45 mg. of $PuO_2$ was used.

References Cited in the file of this patent

UNITED STATES PATENTS

| 2,708,656 | Fermi | May 17, 1955 |
| 2,785,951 | Thompson et al. | Mar. 17, 1957 |
| 2,833,617 | Seaborg et al. | May 6, 1958 |
| 2,873,169 | Seaborg et al. | Feb. 10, 1959 |
| 2,892,681 | Crandall et al. | June 30, 1959 |
| 2,900,230 | Larsen et al. | Aug. 18, 1959 |

OTHER REFERENCES

Friend: "Textbook of Inorganic Chemistry," vol. VII, part III, page 302 (1926). Published by Charles Griffin & Co., Ltd., London.

Technical Progress Reviews on Reactor Fuel Processing, vol. 1, No. 1, page 6, February 1958. Prepared by Argonne National Laboratory for U.S. Atomic Energy Commission.

Proceedings of the International Conference on the Peaceful Uses of Atomic Energy, vol. 9, pages 459–461, Aug. 8–20, 1955, United Nations.